No. 868,143.  
PATENTED OCT. 15, 1907.  
C. F. STRANG.  
AMMONIA EXPANSION VALVE.  
APPLICATION FILED JAN. 21, 1907.
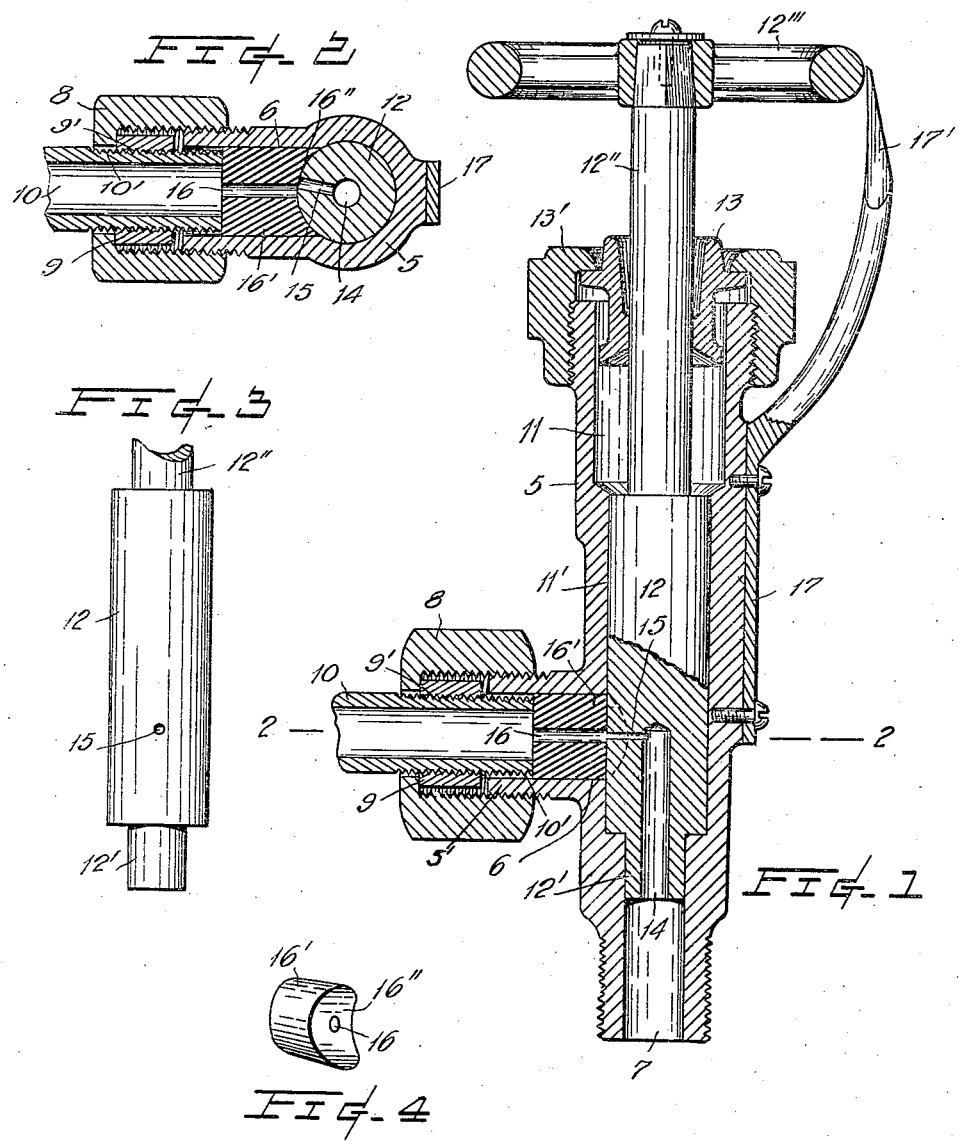
WITNESSES:  
Horace Barnes.  
A. T. Smith.
INVENTOR  
Charles F. Strang  
BY  
Pierre Barnes  
ATTORNEY

UNITED STATES PATENT OFFICE.

CHARLES F. STRANG, OF SEATTLE, WASHINGTON.

AMMONIA EXPANSION-VALVE.

No. 868,143.

Specification of Letters Patent.

Patented Oct. 15, 1907.

Application filed January 21, 1907. Serial No. 353,264.

*To all whom it may concern:*

Be it known that I, CHARLES F. STRANG, a citizen of the United States, residing at Seattle, in the county of King and State of Washington, have invented certain new and useful Improvements in Ammonia Expansion-Valves, of which the following is a specification, reference being had therein to the accompanying drawings.

My invention relates to valves and, more particularly, to that class which are employed for regulating the flow of liquefied ammonia, or other refrigerant, into the expansion chambers or coils of cooling apparatus.

The object of the invention is the improvement of the valve proper together with the provision of an adjustable seat therefor to render the valve more efficient and durable.

With such ends in view the invention consists in the novel construction, adaptation and combination of parts as will be hereinafter described and claimed.

In the drawings, where similar reference characters designate corresponding parts in all the views.—Figure 1 is a vertical section of a valve embodying my improvements; Fig. 2, a horizontal section taken through 2—2 of Fig. 1; Fig. 3, a front elevation of a portion of the valve proper; and Fig. 4, a detached perspective view of the valve seat.

In the drawings, 5 designates a hollow valve casing provided with inlet and outlet openings 6, 7 which, in this instance, are respectively arranged in angular relation with each other, though not necessarily so, as the latter can be oftentimes disposed directly opposite the intake to furnish a straight passage through. Said inlet opening is bored within a lateral branch 5′ of the body which is screw-threaded to receive the internal threads of a gland-nut 8 which engages with a collar 9 secured to the supply pipe 10 so as to be adjustable longitudinally thereof, as by the provision of registering screw threads 9′ and 10′ upon the respective parts.

The casing is formed with a stuffing-box 11, and a cylindrical chamber 11′ for the valve 12 which is provided with a reduced extremity 12′ which protrudes into and is rotatably socketed within the said outlet opening of the case.

Integral with the valve is a stem 12″ which extends through the stuffing-box gland 13 and the gland nut 13′, as common, and has fixedly connected to its outer end an operating wheel 12‴.

Extending into the valve from the outlet opening 7 is a cavity 14 communicating with a relatively small passage 15 extending radially therefrom and arranged so as to be brought through the turning of the valve into register with a port 16 of a plug 16′ removably placed within the aforesaid opening 6. This plug is made of a relatively soft metal which is not subject to being corroded by the refrigerant, such as lead when ammonia is used, and is formed with a concave extremity 16″ of a curvature corresponding with the peripheral surface of the valve thus providing a seat for the latter which can be brought into close fitting contact therewith to prevent the leakage of the liquid and at the same time will not erode the valve to any appreciable extent. Any wear had upon this plug-seat is compensated by moving it toward the valve through a thrust imparted from the pipe 10 by screwing the gland nut 8 against the pipe-collar 9.

17 is an attachment to the valve case provided with an upwardly directed finger 17′ terminating in close proximity of the valve wheel 12‴ and whereupon is an index mark, or a plurality of graduated marks, arranged to indicate through juxtaposition with the finger the position assumed by the valve passage 15 with relation to the port in the valve seat, in other words, the valve may be turned to predeterminately effect the closure of the passage or to open the same to various amounts. Or where desirable, a number of passages, such as 15, of different sizes may be employed and severally indicated by correspondingly arranged index marks upon the wheel so that the required said passage can be brought into operation by presenting the proper marks into register with the finger. Furthermore, the induction passage may be made of triangular or other special shape in cross section in order that the size of the opening of the valve can be regulated to a finer degree than would be attainable by the illustrated example.

The operation of the invention will, it is thought, be understood from the foregoing and needs no further explanation here.

The advantages derived from the present invention reside in the use of a tight fitting seat for a valve which will not cut the latter, it obviates the use of other packing at the intake side of the valve and, in connection with the valve passages, makes it possible to reliably regulate the flow of the ammonia, or other refrigerant, between the pressure and expansion portions of the cooling apparatus.

Having described my invention, what I claim as new and desire to secure by Letters-Patent, is—

1. In a device of the character described, the combination with the valve casing provided with a screw-threaded chambered branch, a cylindrical valve provided with a radially arranged induction passage, a supply pipe, a collar adjustably connected to the pipe, and a nut adapted to be screwed upon said branch and engaging with said collar, of an apertured plug positioned within said branch and between the end of said pipe and the valve, said plug being formed with a concave face to oppose the peripheral surface of the valve.

2. In combination with a valve casing having a threaded chambered branch, a valve in said casing, a supply pipe leading into said branch, an apertured plug formed to engage said valve at one end and being engaged at its opposite end by the end of said supply pipe, a projection on said pipe, and a nut engaging said projection and said threads on said branch.

3. In combination with a valve casing having a chambered branch, a valve in said casing, a supply pipe leading into said branch, an apertured plug in said branch engaged at one end by said pipe and at its opposite end being shaped to engage said valve, and means whereby said supply pipe may be moved inwardly to alter the position of said plug.

4. In combination with a valve casing having a chambered exteriorly threaded branch, a valve in said casing having a radial port, a supply pipe leading into said branch, a perforated plug engaging between said valve and the inner end of said supply pipe, adjusting means for said pipe engaging said branch, and means on said pipe to engage said adjusting means whereby said pipe will be advanced by said adjusting means.

In testimony whereof I affix my signature in presence of two witnesses.

CHARLES F. STRANG.

Witnesses:
PIERRE BARNES,
A. T. SMITH.